Feb. 19, 1952    M. E. WENDT    2,586,587
POLYETHYLENE FILM AS AN ADHESIVE CASTING SURFACE
Filed Oct. 8, 1946
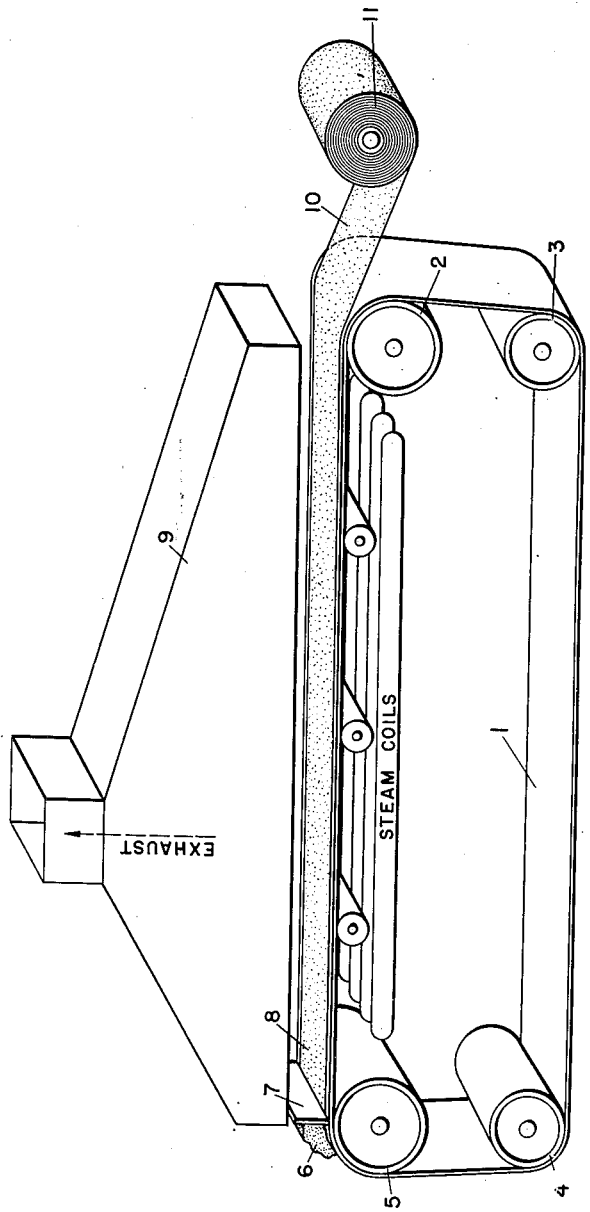
INVENTOR.
MERLE E. WENDT
BY
ATTORNEY Patented Feb. 19, 1952

2,586,587

UNITED STATES PATENT OFFICE 2,586,587

POLYETHYLENE FILM AS AN ADHESIVE CASTING SURFACE

Merle E. Wendt, Akron, Ohio, assignor to Wingfoot Corporation, Akron, Ohio, a corporation of Delaware Application October 8, 1946, Serial No. 701,897

10 Claims. (Cl. 18—57)

This invention relates to a method of casting adhesive materials in sheet form.

Heat activated adhesives are difficult to cast in sheet or self-supporting film form because of the difficulty of removing the adhesive from the casting surface. Many surfaces have been used in the past, including liquid surfaces, as well as rigid surfaces, but none have proven entirely economical and efficient.

A particularly difficult type of adhesive to cast is the one employing a thermosetting resin and a synthetic rubber, and which may be modified with fillers, accelerators, antioxidants and catalysts carried in a suitable solvent. This type of adhesive is difficult to process into sheet form because of its tendency to adhere tenaciously to nearly all surfaces upon which it is cast.

It has now been discovered that adhesives of this type may be successfully cast on a casting surface of polyethylene.

The drawing is a view in perspective showing the casting apparatus employing a casting belt of polyethylene.

The casting surface is generally constructed in the form of a continuous belt 1 supported on suitably positioned rollers 2, 3, 4 and 5, one roller 5 carrying a bank or supply of adhesive 6 to be cast into sheet form, together with a leveling knife 7 adjusted to spread the adhesive picked up on the belt 1 into a film or sheet 8 of desired thickness. The spread film is then passed through a heating zone 9 where it is set to a self-supporting film 10 and then over a cooled roller 2 where the set film is cooled and then stripped or removed from the casting belt 1 and gathered on a storage roll 11.

The polyethylene casting surface is made by casting polyethylene resin into sheet form as, for example, in the manner described in U. S. 2,405,977. The resin is prepared by polymerizing ethylene in the presence of a catalyst and heat in accordance with methods well known in the literature. (See Modern Packaging 18, 122.)

An adhesive which has been cast by this method is one having the following general formulation:

Rubber master batch

| | Parts |
|---|---|
| Rubbery butadiene-1,3/acrylonitrile copolymer | 100.0 |
| An accelerator (e. g., dibenzothiazyl disulfide) | .6– 2.00 |
| An organic acid (e. g., stearic acid) | .2– 1.50 |
| A vulcanizing agent (e. g., sulfur) | 1.5 |
| A filler (e. g., $CaCO_3$) | 1.50–60.0 |

The rubbery butadiene-1,3/acrylonitrile copolymer is prepared in accordance with any of the well known processes for the preparation of a synthetic rubber of this type. Monomer ratios that may be used range from 45/55 to 75/25 of butadiene-1,3 to acrylonitrile.

The rubber master batch is mixed with a stage "A" phenol-formaldehyde thermosetting resin and a solvent as methyl ethyl ketone in amount sufficient to make a cement having from 10 to 40% solids. Generally it is preferred to process a 30% solids cement since a higher or lower solids cement is not as efficient to handle on the casting apparatus. The resin stock may be present in amount between about 5 to 20 parts per 20 parts of rubber stock.

The stage "A" phenol-formaldehyde resin is a water-soluble thermosetting phenol-formaldehyde condensation product which is prepared by reacting a phenol with a molecular excess of an aldehyde, for example formaldehyde, in the presence of an alkaline catalyst until a water-soluble product is produced. More particularly, the resin may be prepared by reacting 50 parts of phenol with 90 parts of 37% formaldehyde in the presence of 1.5 parts of sodium hydroxide at 90° C. for 50 minutes in a water bath.

A sheet of adhesive of any desired gauge may be cast by spacing the lower edge of the spreader knife 7 the desired distance from the upper surface of the polyethylene casting belt 1. Sheets of desired thickness may also be built up by casting successive coats. The gauge of the adhesive sheet is also regulated by adjusting the speed of the casting belt, thicker films being cast at lower belt speeds and thinner film being cast at higher belt speeds, each film being dependent, of course, in part on a fixed spreader knife setting and a given cement viscosity.

The adhesive in sheet form may be used to heat-seal fabric labels to garments such as neckties, dresses, coats, mattresses and sheets. The heat sensitive adhesive in sheet form is particularly adapted to bonding materials that are adversely affected by solvent type cements since an effective bond is made by merely placing a sheet of the adhesive between the parts to be bonded and then applying heat and pressure.

Suitable changes may be made in the details of the process without departing from the spirit or scope of the present invention, the proper limits of which are defined in the appended claims.

I claim:

1. The method of producing a film of heat-activated adhesive which comprises casting the heat-activated adhesive on a surface of polyethylene, setting the cast adhesive to a self-supporting film and removing the film from the casting surface.

2. The method of producing a film of heat-activated adhesive which comprises casting the heat-activated adhesive comprising a synthetic rubber and a thermosetting resin on a surface of polyethylene, setting the cast adhesive to a self-supporting film and removing the film from the casting surface.

3. The method of producing a film of heat-activated adhesive which comprises casting the heat-activated adhesive comprising a butadiene/acrylonitrile synthetic rubber and a thermosetting synthetic resin on a surface of polyethylene, setting the cast adhesive to a self-supporting film and removing the film from the casting surface.

4. The method of producing a film of heat-activated adhesive which comprises casting the heat-activated adhesive comprising a butadiene-1,3/acrylonitrile rubber and a thermosetting synthetic resin on a surface of polyethylene, setting the cast adhesive to a self-supporting film and removing the film from the casting surface.

5. The method of producing a film of heat-activated adhesive which comprises casting the heat-activated adhesive comprising a butadiene/acrylonitrile synthetic rubber and a phenol-formaldehyde thermosetting synthetic resin on a surface of polyethylene, setting the cast adhesive to a self-supporting film and removing the film from the casting surface.

6. The method of producing a film of adhesive which comprises casting an adhesive comprising a phenol-formaldehyde thermosetting resin and a synthetic rubber resulting from the reaction of a mixture comprising 45-75 parts of butadiene-1,3 and 55-25 parts of acrylonitrile on a surface of polyethylene, setting the cast adhesive to a self-supporting film and removing the film from the cast surface.

7. The method of producing a film of adhesive which comprises casting an adhesive comprising a resin resulting from the reaction of a mixture comprising a phenol and a molecular excess of formaldehyde and a synthetic rubber resulting from the reaction of a mixture comprising 45-75 parts of butadiene-1,3 and 55-25 parts of acrylonitrile on a surface of polyethylene, setting the cast adhesive to a self-supporting film and removing the film from the casting surface.

8. The method of producing a film of adhesive which comprises casting an adhesive comprising a resin resulting from the reaction of a mixture comprising 50 parts of phenol and 90 parts of 37% formaldehyde and a synthetic rubber resulting from the reaction of a mixture comprising 45-75 parts of butadiene-1,3 and 55-25 parts of acrylonitrile on a surface of polyethylene, setting the cast adhesive to a self-supporting film and removing the film from the casting surface.

9. The method of producing a film of adhesive which comprises casting an adhesive having from 10 to 40% solids and which adhesive comprises a resin resulting from the reaction of a mixture comprising 50 parts of phenol and 90 parts of 37% formaldehyde and a synthetic rubber resulting from the reaction of a mixture comprising 45-75 parts of butadiene-1,3 and 55-25 parts of acrylonitrile on a surface of polyethylene, setting the cast adhesive to a self-supporting film and removing the film from the casting surface.

10. The method of producing a film of adhesive which comprises casting an adhesive having from 10 to 40% solids and which adhesive comprises 5 to 20 parts of a resin resulting from the reaction of a mixture comprising 50 parts of phenol and 90 parts of 37% formaldehyde, and 20 parts of a synthetic rubber resulting from the reaction of a mixture comprising 45-75 parts of butadiene-1,3 and 55-25 parts of acrylonitrile on a surface of polyethylene, setting the cast adhesive to a self-supporting film and removing the film from the casting surface.

MERLE E. WENDT.

REFERENCES CITED

The following references are of record in the file of this patent:

UNITED STATES PATENTS

| Number | Name | Date |
|---|---|---|
| 1,809,445 | Heuck | June 9, 1931 |
| 1,981,472 | Schneider | Nov. 20, 1934 |
| 2,028,936 | Kratz | Jan. 28, 1936 |
| 2,405,977 | Peters | Aug. 20, 1946 |